(12) United States Patent
Redmond

(10) Patent No.: US 11,674,659 B1
(45) Date of Patent: Jun. 13, 2023

(54) HEADLIGHT ASSEMBLY

(71) Applicant: Christian Douglas Redmond, Middleton, WI (US)

(72) Inventor: Christian Douglas Redmond, Middleton, WI (US)

( * ) Notice: Subject to any disclaimer, the term of this patent is extended or adjusted under 35 U.S.C. 154(b) by 0 days.

(21) Appl. No.: 17/536,461

(22) Filed: Nov. 29, 2021

(51) Int. Cl.
| | |
|---|---|
| *B60Q 1/04* | (2006.01) |
| *F21S 41/43* | (2018.01) |
| *F21V 23/06* | (2006.01) |
| *F21S 41/25* | (2018.01) |
| *F21S 41/141* | (2018.01) |
| *F21W 107/17* | (2018.01) |

(52) U.S. Cl.
CPC ............. *F21S 41/43* (2018.01); *F21S 41/141* (2018.01); *F21S 41/25* (2018.01); *F21V 23/06* (2013.01); *F21W 2107/17* (2018.01)

(58) Field of Classification Search
None
See application file for complete search history.

(56) References Cited

U.S. PATENT DOCUMENTS

| 1,961,836 A * | 6/1934 | Warner .................. F21S 41/33 362/517 |
| 7,425,893 B2 | 9/2008 | Aron et al. |
| 9,284,005 B2 | 3/2016 | Wako et al. |
| 2014/0098555 A1* | 4/2014 | Tessnow ............... F21S 41/285 362/516 |

FOREIGN PATENT DOCUMENTS

| JP | 4059770 B2 | 3/2008 |
| JP | 4094847 B2 | 6/2008 |
| JP | 4385851 B2 | 12/2009 |
| JP | 5639022 B2 | 12/2014 |

* cited by examiner

*Primary Examiner* — Elmito Breval
(74) *Attorney, Agent, or Firm* — Brooks, Cameron & Huebsch, PLLC

(57) ABSTRACT

Devices, methods, and systems for a headlight assembly are described herein. One system includes a first light source that partially obscures a second light source and a channel is coupled between the first light source and the second light source. In some examples, a first mounting tab and a second mounting tab is coupled to a housing containing the first light source and second light source, and a indicator light is press fit onto the housing in a position that is visible to a motorcycle rider from a seated position.

20 Claims, 5 Drawing Sheets

HEADLIGHT ASSEMBLY

BACKGROUND

Motorcycle headlights can be mounted on the front of a motorcycle for safety and visibility during nighttime and adverse conditions. Motorcycle headlights can come in a single light assembly or multiple light sources in a headlight assembly. In some examples, motorcycle headlights can be bulky and produce low light. This can be both aesthetically unpleasing and dangerous in hazardous conditions.

DETAILED DESCRIPTION

Figure 1:
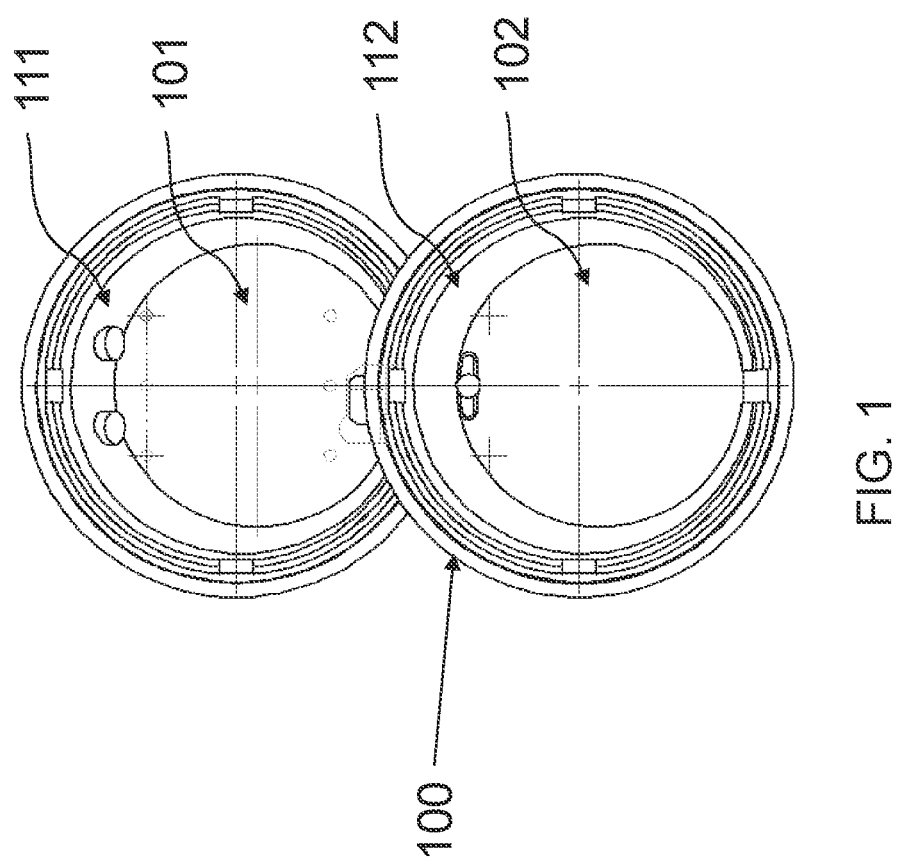
FIG. 1 is an example of a headlight assembly front view according to one or more embodiments of the present disclosure.

Headlight assembly devices, methods, and systems are described herein. For example, one or more embodiments can include one or more light sources partially obscuring another light source. In some examples two light sources are enclosed in a single housing and the two light sources are connected with a channel where the housing enclosing the two light sources has securing tabs that act as a heat sink.

The headlight assembly described herein can be attached to a motorcycle using the securing tabs. In some examples the securing tabs can act as a heat sink for the LED light sources.

In various examples the headlight assembly can be attached to the forks by coupling the securing tabs to the forks. For example the headlight assembly can be attached to the forks so that the indicator lights are visible from the seating position of the motorcycle.

In some examples, the headlight assembly has two light sources where one light source is partially overlapping the other light source. In various examples, the headlight assembly has a channel between the two light sources that can act as a conduit for electrical wires.

Previous systems could utilize multiple light sources in one housing to illuminate the roadway. These previous systems could be mounted on a motorcycle using mounting tabs.

In these previous systems the housings could be bulky and large relative to the size of the motorcycle. This could cause the riders vision to be impaired from their seating position, or have the motorcycle look visually unappealing, in some instances. In some instances the electrical wiring that supplies power to the headlights would consist of two insulated wires that were to be tied into the motorcycles electrical system. This process could lead to the user accidentally misjudging the amount of wire to leave and if the wires were cut too short the headlight assemblies were rendered inoperable.

In some examples, when multiple light sources were used inside the same housing the LED diodes could become overheated with the concentration of LED's adjacent to each other. In some examples the multiple light sources were in separate housings that were connected in a linear fashion such that multiple light sources were adjacent to each other. In these examples the headlight assemblies would fail to align with the angle of the forks and could cause issues with the mounting tabs trying to attach to the forks and prohibited the use of any sort of integration with other indicator lights such as turn signals or warning lights because of the adverse angle of the headlight assembly housing with respect to the seated position of the motorcycle rider.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of users" can refer to one or more users. Additionally, the designator "N", as used herein, particularly with respect to reference numerals in the drawings, indicates that a number of the particular feature so designated can be included with a number of embodiments of the present disclosure.

FIG. 1 is an example of a front view for a headlight assembly according to one or more embodiments of the present disclosure. FIG. 1 illustrates a housing 100 that includes a first light source 101 that is enclosed within a first aperture 111 and a second light source 102 that is enclosed within a second aperture 112. In some examples the first light source 101 partially obscures the second light source 102.

In some examples, the first light source 101 and second light source 102 are oriented vertically wherein the first light source 101 is located in front of the second light source 102. In some examples, this orientation allows the housing 100 to fit in between the front forks of a motorcycle. The front forks are defined as the metal components that attach between the front wheel and the frame of the motorcycle. In this example the housing is oriented parallel to the angle of the forks relative to the horizontal plane of the ground.

In some examples, the first light source 101 can be placed behind the second light source 102 wherein the second light source 102 partially obscures the first light source 101. In these examples, the amount of light that is obstructed by the second aperture is dependent on what motorcycle the headlight is designed to fit based on the angle and width of the forks. Regardless of how much is obstructed there has to be some obstruction of the light emitted to achieve the disclosed design. In order to ensure proper visibility and illumination of the roadway by the headlight assembly a typical example would only have between 10-15% of the light emitted from the first light source 101 obstructed by the second light source 102.

Figure 2:
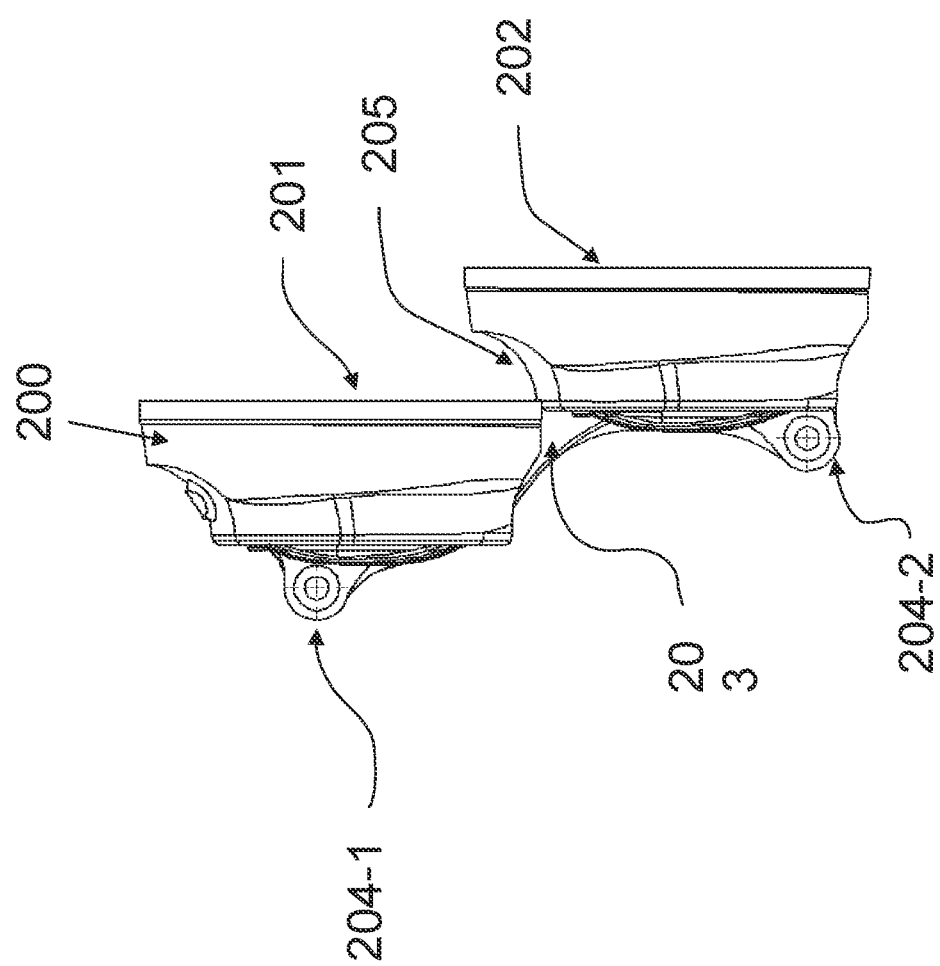
FIG. 2 is an example of a headlight assembly left side view according to one or more embodiments of the present disclosure.

FIG. 2 is an example of a left side view for a headlight assembly according to one or more embodiments of the present disclosure. The left side view is defined in relation to the direction of light emitted as being the front view. FIG. 2 illustrates a housing 200 that includes a first light source 201, a second light source 202, a channel 203 and mounting brackets 204-1 and 204-2. The second light source 202 has a curve along it's depth 205 where the lens of the first light source 201 is attached such that the first light source 201 is offset by the depth of the second light source 202. The leading edge of the curve 205 is defined as the point where the curve starts on the second light source 202 end and terminates at the trailing edge which is the point where the lens of the first light source 201 is coupled to the curve 205. The channel connects to the first light source 201 along the bottom edge of the first aperture and with the second light source 202 along the back of the second aperture.

In some examples the headlight assembly is oriented vertically so that the first light source 201 is on top of the second light source 202. This allows the mounting brackets 204-1 and 204-2 to attach to the forks of a motorcycle at an angle where the light emitted from the first light source 201 and the second light source 202 to illuminate the roadway in front of the motorcycle.

Figure 3:
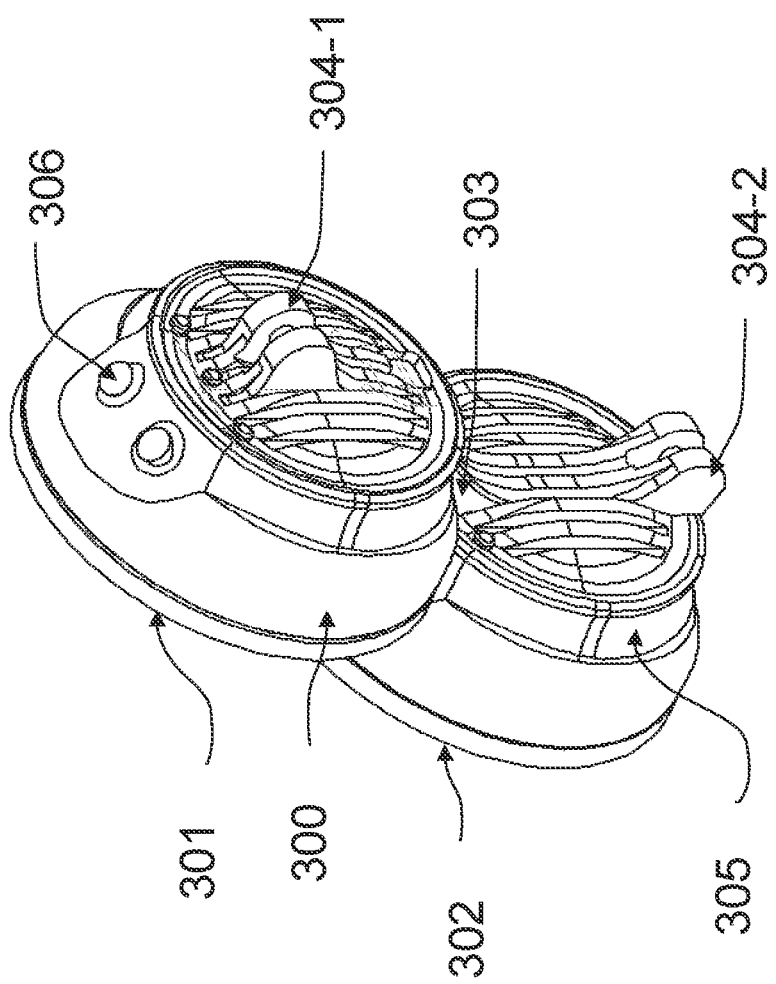
FIG. 3 is an example of a headlight assembly isometric view according to one or more embodiments of the present disclosure.

FIG. 3 is an example of an isometric view for a headlight assembly according to one or more embodiments of the present disclosure. FIG. 3 illustrates the housing 300 that includes a first aperture 301, a second aperture 302 with a curved section 305, a channel 303, mounting tabs 304-1 and 304-2, and indicator lights 306.

In some examples the first aperture 301 is coupled to the second aperture 302 at the edge of the curved section 305. The channel 303 is coupled from the back of the first aperture 301 to the back of the second aperture 302 along the outside edge of the housing 300.

In some examples the housing 300 can be scaled in size depending on the width between the forks of the motorcycle to ensure a proportioned look. In some examples the housing 300 can be fit inside the width of the forks with the mounting tabs attached with any sort of cross member piece.

In some examples the mounting tab 304-1 is coupled to the back of the first aperture 301, and can be centered on the aperture for the ideal positioning to mount to the motorcycle forks where it won't interfere with the channel 303. The mounting tab 304-2 is coupled to the back of the second aperture 302, and can be centered on the back of the second aperture 302. The mounting tabs 304-1 and 304-2 would be oriented such that they could attach to the forks of a motorcycle with a cross member piece.

In some examples with this orientation the indicator lights 306 will be visible from a seated position on the motorcycle by the rider. The indicator lights 306 can depict any relevant details that are desired such as the turn signals, low oil warning, low fuel warning, etc. This incorporated design with integrating the indicator lights 306 into the headlight assembly housing 300 makes for a cleaner look and added functionality over the current art.

Figure 4:
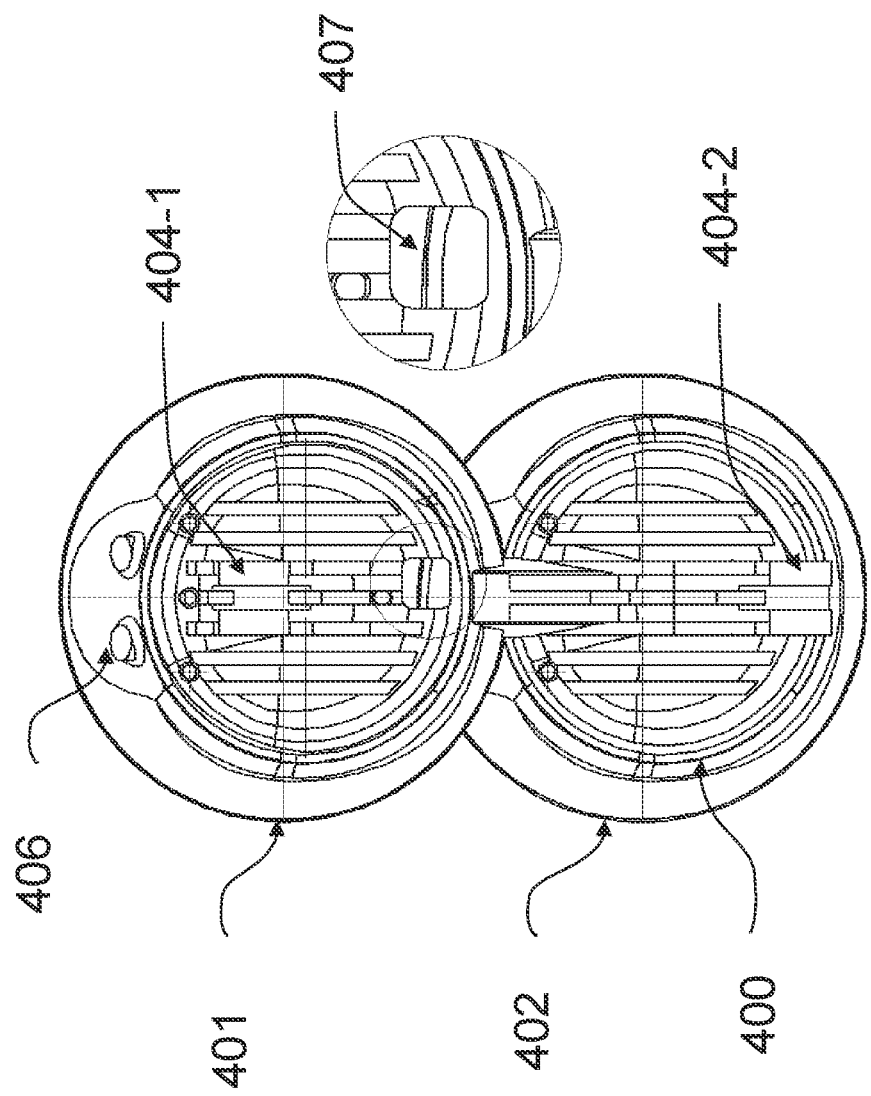
FIG. 4 is an example of a headlight assembly rear view according to one or more embodiments of the present disclosure.

FIG. 4 is an example of a back view for a headlight assembly according to one or more embodiments of the present disclosure. FIG. 4 illustrates the housing 400, the first aperture 401, the second aperture 402, mounting tabs 404-1 and 404-2, indicator lights 406, and a female electrical connector 407.

In some examples the female electrical connector 407 can be press fit into the housing 400 and supplies power to the first light source, the second light source and the indicator lights. This design improves on existing designs by being more compact for improved visibility, and being easier to mount to the motorcycle. Previous designs can also be unforgiving as they only have insulated wires that would tie directly into the motorcycles electrical system. If the user made a wrong cut the previous designs were rendered inoperable or hazardous. The present disclosure improves on the existing techniques by making the electrical connection a female electrical connection for ease of use when installing the headlight assembly onto the motorcycle.

In some examples the amount of light that is blocked by the second aperture 402 is dependent on the type of motorcycle the light is designed to fit. The angle of the forks relative to the ground directly correlates to the percentage of light blocked by the second aperture 402 based on simple geometric principles. As the angle of the forks relative to the ground approaches parallel the percentage of blockage by the second aperture 402 decreases.

Figure 5:
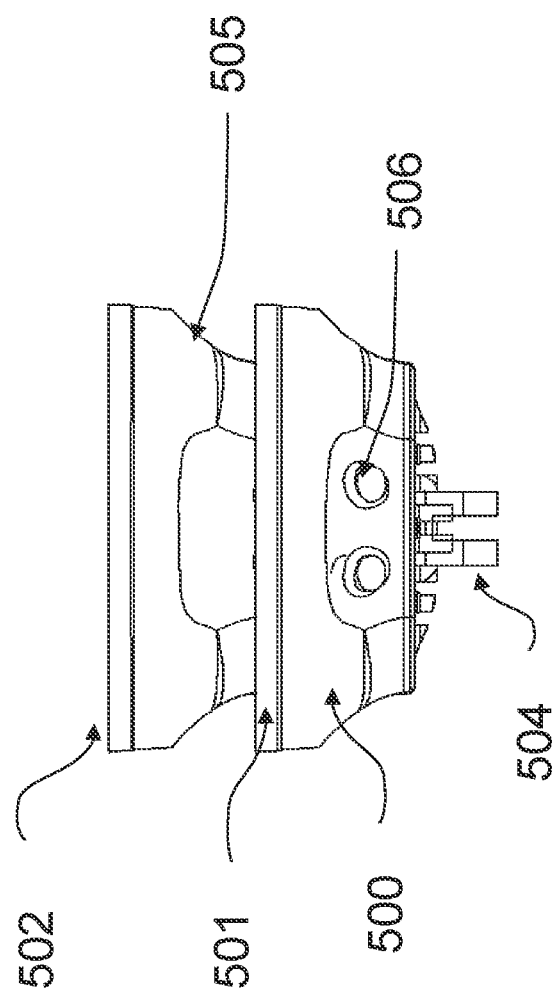
FIG. 5 is an example of a headlight assembly top view according to one or more embodiments of the present disclosure.

FIG. 5 is an example of a back view for a headlight assembly according to one or more embodiments of the present disclosure. FIG. 5 illustrates the housing 500, a first aperture 501, a second aperture 502, mounting tab 504, the curve on the second aperture 505 and indicator lights 506.

In some examples the first aperture 501 is attached to the back of the second aperture 502. From this view it shows the curve 505 delineates the distance between the front of the first aperture 501 and the second aperture 502. The front of the first aperture 501 is in reference to the direction that light is emitted from the first light source within the first aperture 501.

In some examples the indicator lights 506 are press fit into the housing 500 on the top of the first aperture 501. In this example the indicator lights 506 are centered on the top of the first aperture. In this position the indicator lights 506 are in the best position to be visible from the seat of the motorcycle.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above elements and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A headlight assembly, comprising:
   a housing;
   a first light source coupled at a first position of the housing to direct light in a particular direction through a first aperture; and
   a second light source coupled at a second position of the housing to direct light in the particular direction through a second aperture, wherein a portion of the second aperture blocks a portion of the first aperture in the particular direction to limit the area of the first aperture to direct light in the particular direction.

2. The headlight assembly of claim 1, wherein the housing contains a channel coupled between the first position and the second position wherein the channel contains an electrical connection between the first light source and the second light source.

3. The headlight assembly of claim 2, wherein a female electrical connector is coupled at a third position of the housing such that the female electrical connector supplies power to the first light source and second light source.

4. The headlight assembly of claim 1, wherein the first aperture is oriented vertically with respect to the second aperture wherein the first aperture is positioned on top of the second aperture.

5. The headlight assembly of claim 4, wherein the first aperture is coupled to a back of the second aperture relative to the direction of light emitted by the light source wherein the first aperture is offset by a depth of the second aperture.

6. The headlight assembly of claim 5, wherein a channel is coupled to the first aperture along a bottom curve of the first aperture and is coupled to the second aperture at a third position where the first and the second aperture are coupled together.

7. A headlight assembly, comprising:
   a housing with a first position and a second position;
   a first light source coupled at the first position to direct light in particular direction through a first aperture; and
   a second light source coupled at the second position to direct light in the particular direction through a second aperture, wherein a portion of second light source blocks a portion of light directed through the first aperture; and
   a channel coupled between the first position and the second position wherein the channel contains an electrical connection between the first light source and the second light source.

8. The headlight assembly of claim 7, wherein the first light source and the second light source contains an LED and a Lens.

9. The headlight assembly of claim 8, wherein the channel is coupled to a bottom of the first light source and coupled to a top of the second light source.

10. The headlight assembly of claim 9, wherein the lens of the first light source is attached to a back of the second aperture wherein the lens of the first light source is offset by a depth of the second aperture.

11. The headlight assembly of claim 10, wherein an edge of the second aperture forms a curve along its depth and the lens of the first light source is coupled to a trailing edge of the curve on the back of the second aperture.

12. The headlight assembly of claim 7, wherein a first mounting bracket is attached to a back of the first aperture and a second mounting bracket is attached to the back of the second aperture.

13. The headlight assembly of claim 12, wherein the first mounting bracket is centered on the back of the first aperture such that it doesn't come in contact with the channel and provides a point of attachment for the housing onto forks of a motorcycle.

14. The headlight assembly of claim 13, wherein the second mounting bracket is centered on the back of the second aperture such that it doesn't come in contact with the channel and provides a point of attachment for the housing onto the forks of a motorcycle.

15. A headlight assembly, comprising:
   a housing;
   a first light source coupled at a first position of the housing to direct light in particular direction through a first aperture;
   a second light source coupled at a second position of the housing to direct light in the particular direction through a second aperture, wherein a portion of second light source blocks a portion of light directed through the first aperture;
   a channel coupled between the first position and the second position wherein the channel contains an electrical connection between the first light source and the second light source; and
   a first mounting bracket attached to a back of the first aperture and a second mounting bracket attached to a back of the second aperture.

16. The headlight assembly of claim 15, wherein an edge of the second aperture forms a curve along its depth and the first aperture is coupled to an end of the curve such that the first aperture is offset by the depth of the second aperture.

17. The headlight assembly of claim 16, wherein an indicator light is press fit into the housing at a third position on a top of the first aperture such that it can be viewed from a seated position on a motorcycle.

18. The headlight assembly of claim 15, wherein the electrical connection in the channel is coupled to a female electrical connector that is press fit into the housing at a fourth position on the back of the first aperture.

19. The headlight assembly of claim 18, wherein the fourth position is located on the back of the first aperture adjacent to the channel such that the electrical connection between the channel and the female electrical connection is minimized.

20. The headlight assembly of claim 15, wherein the first mounting bracket is centered on the back of the first aperture and the second mounting bracket is centered on the back of the second aperture such that the first mounting bracket and the second mounting bracket are oriented vertically with each other.

* * * * *